(No Model.)
S. CURTISS.
STRIP FOR REPELLING AND DESTROYING VERMIN.
No. 274,284. Patented Mar. 20, 1883.
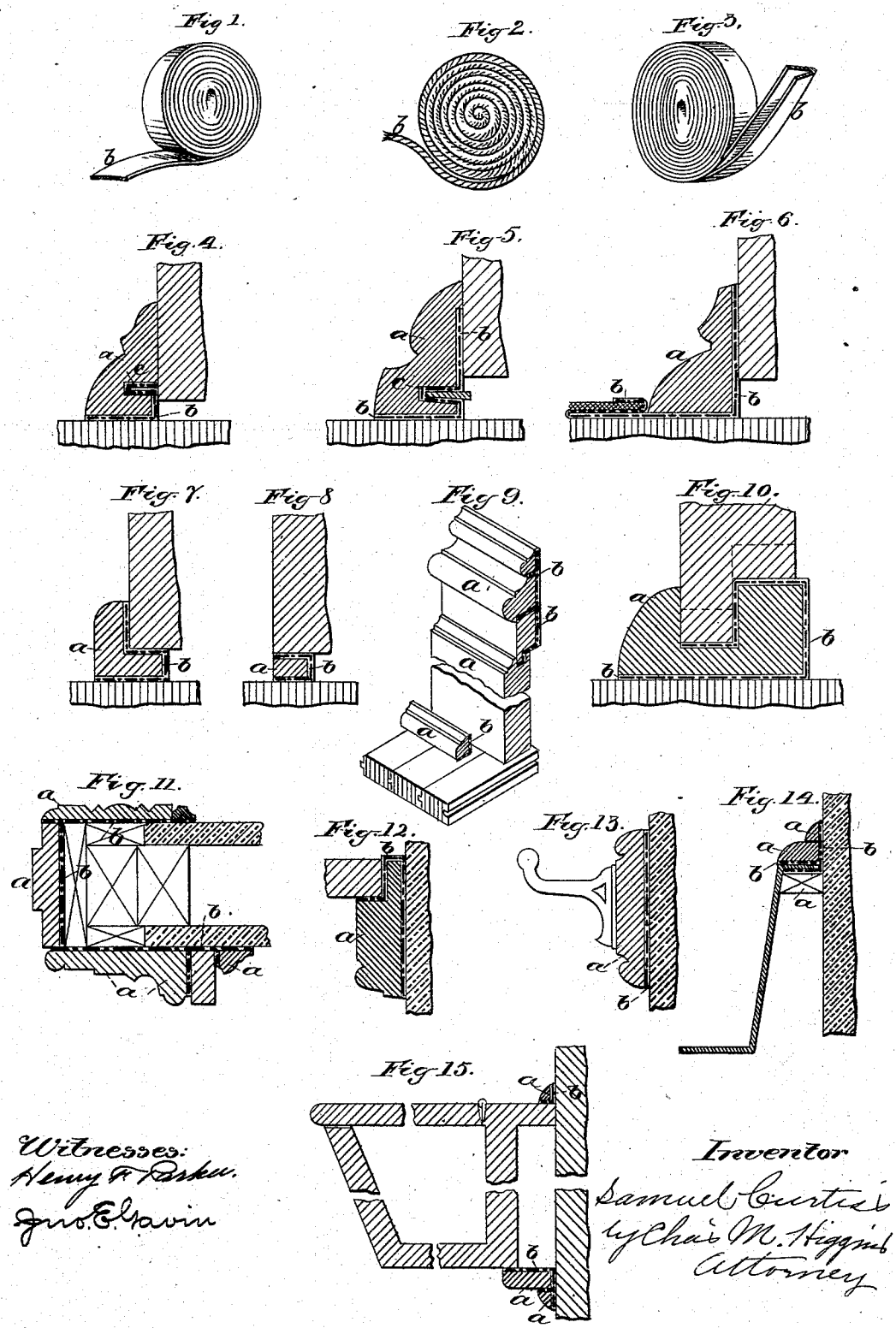

UNITED STATES PATENT OFFICE.

SAMUEL CURTISS, OF BROOKLYN, NEW YORK.

STRIP FOR REPELLING AND DESTROYING VERMIN.

SPECIFICATION forming part of Letters Patent No. 274,284, dated March 20, 1883.

Application filed January 19, 1883. (No model.)

*To all whom it may concern:*

Be it known that I, SAMUEL CURTISS, of Brooklyn, Kings county, New York, have invented Novel Strips or Moldings for Repelling or Destroying Vermin, of which the following is a specification.

The aim of my invention is to provide a means whereby the crevices or joints around moldings or other inner fittings of houses, or around the joints of furniture or other structures wherein insects or other vermin find refuge, may be stopped up or protected with a vermin-destroying material, which shall prevent the vermin from finding a refuge in their usual haunts and present a poisonous barrier to their passage in or out.

To this end the main feature of my invention consists in longitudinal strips, of any suitable size, shape, or material, charged or provided with vermin-destroying material, and adapted to be stuffed or fastened in or over the crevices, around or under moldings, or in other crevices or joints in the inner wood-work of houses, or in the joints of household furniture or other structures.

I prefer to prepare ordinary moldings so that they shall directly serve the purpose of vermin-destroying strips by being charged or coated with vermin-destroying material, and this forms a secondary feature of my invention; but the vermin-destroying strip may be prepared and sold separate from the moldings in the form of a band of saturated felt or other suitable material, which may be fastened under moldings of the ordinary kind, or stuffed in the crevices around the same, as hereinafter fully set forth.

It is well known that the joints or crevices of the various moldings and strips used in the interior fittings of houses, as well as in the household furniture, particularly in the moldings around door-frames, window-casings, bases, sinks, wash-tubs, closets, &c., afford safe haunts for the various kinds of household vermin, such as cockroaches, bedbugs, beetles, &c., in which they breed rapidly, and from which they constantly swarm, to the great annoyance of the occupants of the house, who can effect very little injury on them in their minute and practically inaccessible crevices, in which the introduction of insect-powders can seldom be properly effected, and where the vermin, hence, continue to exist and multiply with little or no hinderance from all the usual means employed to destroy them. It is also well known that even perfectly-new houses which have never yet been occupied will be found to be infested with cockroaches and bugs, which swarm in the crevices and joints of the various moldings in the house, their germs or eggs having been brought there during the construction, or a few adult insects having obtained shelter therein and afterward multiplied into a swarming progeny. It is therefore believed that if such moldings are prepared at the outset, so as to be destructive or repellent to insect life, such lodgment of vermin will be prevented; or if a few do take refuge in the joints of the moldings they will soon be repelled or destroyed by the preparation with which the moldings are provided, thus overcoming the evil at the outset and at its source, and preventing the vermin from obtaining any advantageous refuge from which they cannot be easily reduced.

My invention does not confine itself to any special shape of strip or molding, or to any particular vermin-destroying material with which the same may be provided, nor to any particular manner of applying the material to the moldings; but I will here describe and illustrate several ordinary forms of moldings for different uses prepared with the insect-destroying materials in a particular way.

The figures in the annexed drawings represent various forms in which my improved vermin-destroying strips may be provided.

Figures 1, 2, and 3 represent continuous flexible strips done up in rolls and adapted to be cut off in suitable lengths, as required, and stuffed into crevices where the vermin take refuge, or fastened under moldings, so as to close the crevices or joints usually existing about moldings. The remaining figures present cross-sections of various forms of ordinary moldings prepared or faced with vermin-destroying material and adapted for various situations, chiefly in the interior wood-work of houses. Figs. 4, 5, 6, 7, 8, and 10 represent various forms and arrangements of carpet or base moldings in cross-section. Fig. 9 is a perspective view of a base made up of several of my prepared moldings. Fig. 11 represents a section of a door-frame formed with my improved moldings. Fig. 12 shows a shelf-cleat molding for closets. Fig. 13 represents a wall-molding for coat-hooks. Fig. 14 represents my prepared moldings used at the edges of sinks, and Fig. 15 represents my improved moldings used at the angles where stationary wash-tubs are joined to the walls.

In Fig. 1 is shown a flat strip of flexible material, of suitable width and thickness, prepared or charged with suitable vermin-destroying material, and adapted to be used to fill up crevices around moldings and other places where vermin exist, as before indicated. This strip may be made of felt, paper, or of woven fabric saturated with some substance repellent or poisonous to insects or other vermin, as hereinafter more particularly specified, and the strip when thus prepared may be coiled in rolls, as indicated in Fig. 1, forming a compact package in which the article may be offered for sale, and from which suitable lengths may be cut as its use requires.

In Fig. 2 the vermin-destroying strip is prepared in the form of a rope or cord of suitable size and material saturated with vermin-destroying material, as in the first case. This strip or cord may be cut off in suitable lengths, and can be stuffed into any crevices which harbor vermin, and will speedily act to banish or destroy them, or prevent them from finding any safe refuge from which they cannot be easily removed.

Fig. 3 shows a strip of similar material to Fig. 1, but folded in a V-shaped fold, whereby it can be easily forced into chinks or crevices by a calking-chisel or similar calking-tool, as will be understood, and will form a very simple and efficient form of vermin-destroying strip, as the elasticity of the folded strip will cause the two members of the V-fold to spring apart and close the crevice in a very perfect manner.

While the aforesaid forms of my invention will be quite convenient and effective for certain purposes and situations, yet I greatly prefer to prepare ordinary joiners' moldings with vermin-destroying material, so as to serve as vermin-destroying strips, as in most cases the strips will be more easily applied in this way, and will be more effective and present a neater finish in the places where relief from household vermin is desired, and I will therefore now describe these preferred forms of my invention, which are illustrated in Figs. 4, 5, 6, 7, 8, 9, 10, 11, 12, 13, 14, and 15.

In these several figures, $a$ $a$ indicate the moldings or strips of various sizes and forms for the different purposes represented. These moldings are of course preferably made of wood in the ordinary manner; but in some cases they may be made of other materials. Wood, however, is the chief material contemplated, and in this case the wood may be charged or saturated throughout with vermin destroying material, but I prefer to apply the vermin-destroying material, ordinarily upon the exterior, in a film, coating, or layer, and preferably on the inner or attaching surfaces or sides of the moldings only—that is, on those sides which are concealed or attached when the moldings are affixed in place—as will be understood from the drawings, in which $b$ $b$ represent the coating or layer of insect or vermin-destroying material, which, it will be noted, is applied on the inner concealed or attached sides and surfaces of the moldings only. This coating may be applied, in the manner of paint or varnish, with a brush, or a layer of some fibrous absorbent material—such as paper or felt—may be saturated with the destructive material and cemented or otherwise fastened on the moldings, as represented. I greatly prefer to apply the material in the latter manner, which is what the drawings are designed to represent, as this possesses a second and important advantage—that is, the saturated felt or fibrous layer $b$ forms an elastic or padded facing on the inner or attaching faces of the moldings, so that when the moldings are nailed or fastened in place this facing will become somewhat compressed, and thus conformed to the irregularities of surface on the parts to which it is attached, thereby producing a very tight joint, leaving little or no crevice for insects to pass either in or out. Insects which are thus imprisoned in or excluded from the cavities of the walls or framework which are closed by the moldings cannot therefore either escape or enter at the usual crevices of the moldings without coming in contact with the destructive material $b$, or without gnawing away the same to provide themselves a passage, which, in either case, will soon result in their repulsion or destruction. Hence by this means not only are the usual crevices or haunts of the vermin stopped up, but a poisonous barrier is presented to their passage in or out, thereby overcoming the evil of household vermin in a double manner—that is, by both prevention and destruction. At the same time this result is effected by a simple and neat means, as the prepared moldings will cost very little more than ordinary moldings, and their appearance will be the same; and they will be in no way injurious to the inmates of the house or to the domestic animals therein. It is therefore believed that when these improved moldings are employed in the construction of new houses a most effective preventive to household vermin will be accomplished.

As before remarked, I do not confine myself to any special chemical or poisonous material for coating the molding or saturating the felt layer $b$; but among many chemicals that may be used I would mention that a saturated solution of borax or of alum may be used to charge the felt $b$, so that when the felt is dried and affixed to the moldings it will be charged with crystals of the aforesaid materials, which will repel or destroy the vermin coming in contact with it or attempting to gnaw it, as will be readily understood. I would further suggest the following as a very effective mixture with which the felt $b$ may be charged or the molding coated: carbolic acid, (crystal,) one part; glycerine, two parts; linseed-oil, two parts; gelatine, two parts. The carbolic acid may be added to the linseed-oil while the latter is boiling, or while quite hot, in which it will become liquefied, and thence mixed thoroughly therewith. The glycerine can then be added, when the oil has cooled sufficiently to allow of it, at which time also the gelatine may be incorporated. The gelatine may be soaked in cold water, or in the glycerine, with the addition of a little water, before it is incorporated with the oil and acid, as will be understood. This mixture will form a gelatinous or varnish-like compound, which may be applied to the inner faces of the moldings with a brush; or felt or other absorbent material may be first saturated with the compound while hot and fluid and then allowed to set by cooling, after which the saturated felt may be applied to the moldings, as already described.

I propose to use my vermin-proof strips or moldings wherever there is liability to the ravages or for the harboring of vermin, whether insects or rats and mice such as in buildings of all kinds; also, in railway-cars, ships, steamboats, yachts, or other vessels, as well as in furniture, and for all purposes where moldings or strips are used, and wherever it may be desirable to kill or exterminate vermin, or to shut out, keep back, or prevent the harboring of vermin, either in old or new structures.

Where the moldings are used to exclude rats or mice they may be made of oak or hickory wood, so that they may not be easily gnawed away.

Referring to Figs. 4, 5, 6, 7, and 10, showing carpet-moldings, I would remark that it is preferable that the moldings shown in these figures be nailed down to the floor close up to the base, so that as the floor-beams shrink and take the floor with them the vermin-proof molding will still close the aperture that may be made or increased between the floor and base, and still keep back and destroy any vermin that may attempt to pass through or between them. In Fig. 4 the molding has a groove, $c$, in the back, into which the vermin-proof felt or material $b$ is folded and held fast. In Fig. 5 the felt is held in a similar groove by a wedging-strip, $d$. The backs of these moldings may be rabbeted, as shown, so as to let in the edge of the felt and allow the lip or top edge of the wooden molding to impinge directly on the face of the base or wall, as illustrated. In Fig. 6 the vermin-proof coating or felt-layer $b$ is extended beyond the base of the molding out onto the floor and under the margin of the carpet, and is thence folded back on itself and turned up over the edge of the carpet, so as to effectually prevent moths or other insects from entering thereunder.

Fig. 11 shows my improved moldings used for shutting out vermin from behind and between the back bands of door and window casings or trimmings and the plastering or paper or other wall or ceiling hangings.

In Fig. 12 the shelf-cleats prepared with the vermin-proof material, as shown, will prevent the harboring of vermin around the joints or the passage of vermin from walls to shelves, thus protecting the closets from the ravages thereof.

Whenever walls or ceilings are hung with paper-hangings, or with silk, woolen, tapestry, or any other hangings, all the edges thereof may be protected from the ravages or the lodgment of moths or other vermin by having the vermin-proof moldings, of suitable size and shape, appropriately secured thereon.

Pictures may also be protected from moths or other vermin by the use of my prepared moldings, from which the frames may be made, as will be understood.

Iron or other sinks for kitchens, pantries, or other places, as well as wash trays or tubs, may be protected, as shown in Figs. 14 and 15, by being set in a suitable manner on the vermin-proof strips and covered with a vermin-proof casing-strip and cap-moldings, as illustrated.

Joints of bedstead-rails may be made proof to the harboring of vermin by the use of my prepared moldings properly applied thereto, as will be readily appreciated.

Where rats or mice are troublesome, I would recommend the use of hard-wood moldings faced with wire-cloth having its mesh painted or charged with poisonous matter, which will effectually prevent their efforts to gnaw their way in or out.

What I claim as my invention is—

1. Longitudinal strips prepared or charged with vermin-destroying material, and adapted to be used to close chinks or crevices wherein vermin lodge, and thereby serve to repel or destroy the same, substantially as herein shown and described.

2. A new article of manufacture consisting of moldings or strips provided with vermin-destroying material, substantially as and for the purpose set forth.

3. Moldings or strips provided with vermin-destroying material on their inner or attaching sides or surfaces, substantially as and for the purpose set forth.

4. Moldings or strips provided with vermin-destroying material in an elastic or yielding coating or facing, substantially as and for the purpose set forth.

5. Moldings or strips provided with a facing of felt or equivalent absorbent or fibrous material charged with vermin-destroying material, substantially as and for the purpose set forth.

SAMUEL CURTISS.

Witnesses:
CHAS. M. HIGGINS,
JNO. E. GAVIN.